(12) United States Patent
Sonehara et al.

(10) Patent No.: US 9,815,194 B2
(45) Date of Patent: Nov. 14, 2017

(54) FORCE CONTROL ROBOT AND METHOD FOR CONTROLLING SAME

(71) Applicant: IHI CORPORATION, Tokyo (JP)

(72) Inventors: Mitsuharu Sonehara, Tokyo (JP); Koichiro Hayashi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 267 days.

(21) Appl. No.: 14/831,153

(22) Filed: Aug. 20, 2015

(65) Prior Publication Data

US 2015/0352716 A1    Dec. 10, 2015

Related U.S. Application Data

(63) Continuation of application No. PCT/JP2014/053975, filed on Feb. 20, 2014.

(30) Foreign Application Priority Data

Feb. 20, 2013 (JP) ................................. 2013-031271

(51) Int. Cl.
| | |
|---|---|
| *G05B 15/00* | (2006.01) |
| *B25J 9/16* | (2006.01) |
| *B25J 15/00* | (2006.01) |
| *B25J 11/00* | (2006.01) |
| *B25J 13/08* | (2006.01) |

(52) U.S. Cl.
CPC ........... *B25J 9/1612* (2013.01); *B25J 9/1633* (2013.01); *B25J 11/005* (2013.01); *B25J 13/085* (2013.01); *B25J 15/0019* (2013.01); *B25J 15/0052* (2013.01); *G05B 2219/39322* (2013.01); *G05B 2219/39529* (2013.01); *Y10S 901/10* (2013.01)

(58) Field of Classification Search
None
See application file for complete search history.

(56) References Cited

FOREIGN PATENT DOCUMENTS

| JP | 61-038850 A | 2/1986 |
|---|---|---|
| JP | 63-011264 A | 1/1988 |
| JP | 07-266269 A | 10/1995 |
| JP | 08-118276 A | 5/1996 |
| JP | 08-118278 A | 5/1996 |
| JP | 11-077243 A | 3/1999 |
| JP | 2004-291157 A | 10/2004 |
| JP | 2009-166076 A | 7/2009 |
| JP | 2012-020348 A | 2/2012 |
| JP | 2012-176477 A | 9/2012 |

OTHER PUBLICATIONS

International Search Report, PCT/JP2014/053975, Mar. 18, 2014, 2 pgs.

*Primary Examiner* — Bhavesh V Amin
(74) *Attorney, Agent, or Firm* — Volpe and Koenig, P.C.

(57) ABSTRACT

An end effector includes a pair of machining tools. The pair of machining tools is separated by an interval in one direction perpendicular to a tool rotational axis and rotatable around the tool rotational axis. The pair of machining tools is position-controlled, and is force-controlled in a machining direction perpendicular to the one direction and an axial direction of the tool rotational axis, and is torque-controlled around the tool rotational axis.

7 Claims, 10 Drawing Sheets

FORCE CONTROL ROBOT AND METHOD FOR CONTROLLING SAME

This application is a continuation application based on a PCT Patent Application No. PCT/JP2014/053975, filed Feb. 20, 2014, whose priority is claimed on Japanese Patent Application No. 2013-031271, filed Feb. 20, 2013. The contents of both the PCT application and the Japanese Patent Application are incorporated herein by reference.

TECHNICAL FIELD

The disclosure relates to a force control robot which performs polishing, deburring, chamfering, or the like, and a method for controlling the same.

BACKGROUND ART

A force control robot performs force control, compliance control, or the like using a feedback signal by a force sensor. The force control robot has been disclosed in, for example, Patent Literatures 1 to 4.

That is, a tool is pressed against a component by the force control or the compliance control to thereby make it possible to perform machining while correcting the trajectory of the tool against variations in a machined shape, an installation error, an error of a robot itself, or the like.

In the case of such a force control robot, it is moved in a direction (feed direction) along the profile line or the like of the component by position control or speed control, and polishing, deburring, chamfering, or the like is performed in a direction perpendicular to the feed direction by the force control for pressing with a constant force or the like.

CITATION LIST

Patent Literature

PTL 1: Japanese Patent Publication Laid-open No. 2012-20348
PTL 2: Japanese Patent Publication Laid-open No. Hei 8 (1996) -118278
PTL 3: Japanese Patent Publication Laid-open No. Hei 8 (1996) -118276
PTL 4: Japanese Patent Publication Laid-open No. Hei 7 (1995)-266269

SUMMARY

Technical Problem

Since the machining (polishing, deburring, chamfering, or the like) by the above-described force control robot is generally carried out by control based on the feedback signal from the force sensor, the force control robots respectively have individual dynamic characteristics, and are accompanied by a response delay. Since the dynamic characteristics and the response delay are determined by the performance of the force control robot itself, a tool to be used, and the like, it is generally difficult to freely change them.

Therefore, when a machining speed is increased and a feed speed is made high to enhance the productivity, it is not possible to follow the change if the variations in machining shape, the installation error, the error of the robot itself, or the like is large.

As a result, there are possibilities such as that (1) the tool cannot be pressed with the constant force (pressing force is varied) so that stable machining is not possible, (2) the tool is spaced apart from a workpiece, and machining cannot be carried out, (3) in the worst case, an excessive force is received without the force being able to be absorbed, so that a sensor or a device will be damaged.

Further, since the response speed and accuracy of force control depend on ability (i.e., control cycle) of a control device performing the force control, and the mechanical response performance of the force control robot itself, there are also considered measures such as improvement in the performance of the control device.

However, in the case of the improvement in the performance of the control device, a general industrial general-purpose robot which is commercially available cannot be utilized. Thus, a special device is used and equipment cost is increased.

Solution to Problem

Further, in a device which performs a complicated operation as in the force control robot, a filter (delay component) or the like to eliminate an unstable input is also often incorporated in a control command unit such that a complicated operation by a control command is stably performed. A delay caused by this filter is dominant, and a significant increase in the feed speed cannot often be achieved.

The disclosed robot and method have been devised to solve such a problem. That is, an object of the disclosure is to provide a force control robot capable of carrying out machining by force control such as polishing, deburring, and chamfering at a speed higher than a conventional one, using a conventional general-purpose robot, and a method for controlling the same.

According to the disclosure, there is provided a force control robot, including:
a force sensor attached to a hand tip portion; and
an end effector attached to the force sensor,
wherein the end effector includes a pair of machining tools spaced apart from each other in one direction perpendicular to a tool rotational axis and rotatable around the tool rotational axis,
the force control robot includes a three-dimensional robot capable of moving the hand tip portion in a three-dimensional space in terms of a position and orientation thereof, a robot controller which controls a position and orientation of the three-dimensional robot, and a force control device which creates a position command value, a speed command value, or a torque command value for the end effector on the basis of detected data of the force sensor and inputs the same to the robot controller, and
wherein the force control robot position-controls the pair of machining tools, force-controls the pair of machining tools in a machining direction perpendicular to the one direction and an axial direction of the tool rotational axis, and torque-controls the pair of machining tools around the tool rotational axis.

Further, according to the disclosure, there is provided a method for controlling a force control robot including a force sensor attached to a hand tip portion and an end effector attached to the force sensor,
wherein the end effector includes a pair of machining tools spaced apart from each other in one direction perpendicular to a tool rotational axis and rotatable around the tool rotational axis, and
the method position-controls the pair of machining tools, force-controls the pair of machining tools in a machining direction perpendicular to the one direction and an axial direction of the tool rotational axis, and torque-controls the pair of machining tools around the tool rotational axis.

According to an embodiment, the position control is carried out in the one direction, the axial direction of the tool rotational axis, or a composite direction of the one direction and the axial direction of the tool rotational axis.

The position control may be carried out in a direction along a machining surface of a workpiece.

Further, rotational shafts of the pair of machining tools may be arranged parallel to each other.

Furthermore, the tool rotational axis may be positioned on a rotational shaft of one of the pair of machining tools, and pressing force against the workpiece by the other machining tool may be controlled by the torque control.

The tool rotational axis may be positioned on a midpoint of rotational shafts of the pair of machining tools to be parallel with the rotational shaft, and torque by the torque control may be controlled to be 0.

Effects

According to the device and method of the disclosure, an end effector includes a pair (two) of machining tools. The two machining tools are torque-controlled around a tool rotational axis to thereby enable position control on the two machining tools and force control against a workpiece to be simultaneously implemented by a single force control robot.

Thus, even if a machining speed (polishing, deburring, chamfering or the like) by the single machining tool is the same as conventional one, a machining speed twice the machining speed can be achieved by the two machining tools.

DESCRIPTION OF EMBODIMENTS

Embodiments of the disclosure will hereinafter be described in detail based on the accompanying drawings. Parts common in the respective drawings are denoted by the same reference numerals, and overlapping description will be omitted.

Figure 1:
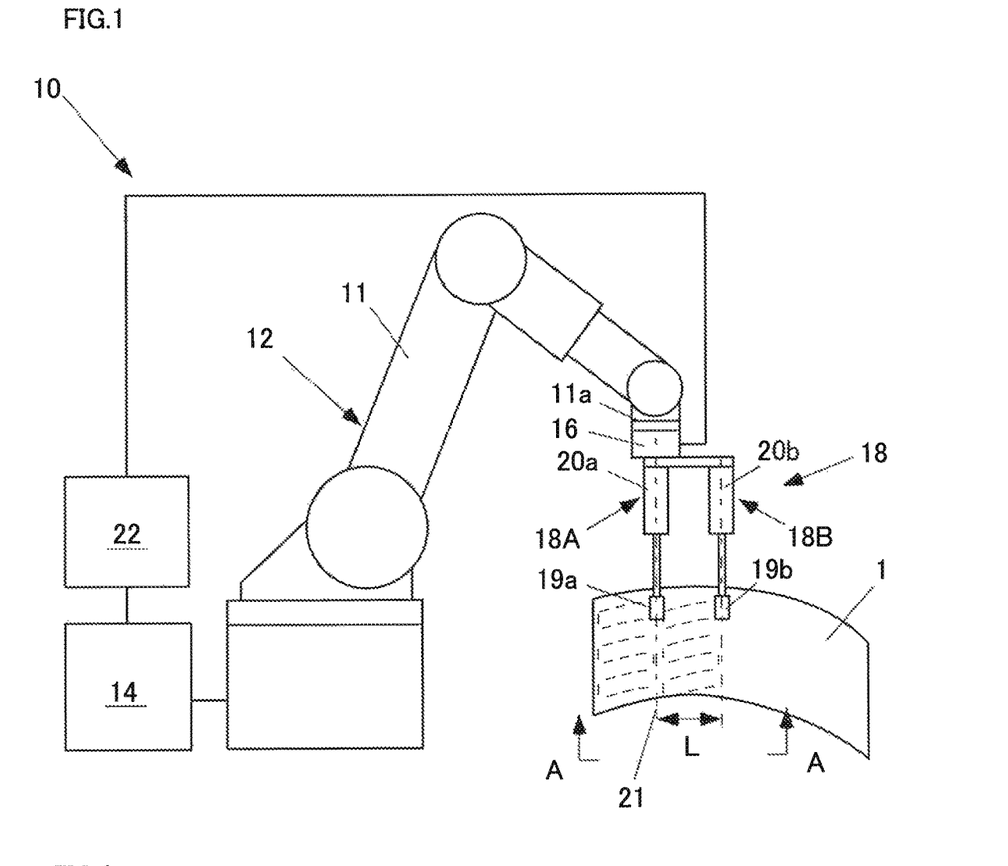
FIG. 1 is a first embodiment diagram of a force control robot according to an embodiment.

FIG. 1 is a first embodiment diagram of a force control robot 10 according to an embodiment.

In this figure, the force control robot 10 is equipped with a three-dimensional robot 12, a robot controller 14, a force sensor 16, an end effector 18, and a force control device 22.

In this example, the three-dimensional robot 12 is a multi-articulated arm robot capable of moving a hand tip portion 11a of a robot arm 11 in a three-dimensional space in terms of its position and orientation. The three-dimensional robot 12 may be a different robot as long as the hand tip portion 11a can be moved in the three-dimensional space in terms of its position and orientation.

The robot controller 14 is a control device for controlling the position and orientation of the three-dimensional robot 12.

In this example, the force sensor 16 is attached to the hand tip portion 11a of the robot arm 11, and detects force in orthogonal three-axis directions received from outside, and torque around the orthogonal three axes.

The end effector 18 includes a pair of machining tools 18A and 18B attached to the force sensor 16. Rotational shafts of the pair of machining tools 18A and 18B may be arranged parallel to each other.

In this example, the pair of machining tools 18A and 18B respectively include cylindrical tools 19a and 19b, and spindles 20a and 20b which rotatably drive the tools 19a and 19b around their axial centers.

The whole pair of machining tools 18A and 18B is rotatable around a tool rotational axis 21.

Rotational shafts of the pair of spindles 20a and 20b are configured so as to be separated by an interval L in one direction (left/right direction in the figure) perpendicular to the tool rotational axis 21 and rotatable around the tool rotational axis 21.

The tool rotational axis 21 is positioned on the rotational shaft of one (18A in this example) of the pair of machining tools 18A and 18B.

The force control device 22 creates a position command value of the end effector 18 by data detected by the force sensor 16, and inputs the same to the robot controller 14.

Although the robot controller 14 is a position control type for position-controlling the three-dimensional robot 12 in response to the position command in this example, the robot controller 14 may be a speed control type for controlling the speed of the three-dimensional robot 12 in response to a speed command, or a torque control type for torque-controlling the three-dimensional robot 12 in response to a torque command (or current command).

The output from the force control device 22 is the position command value in this example. However, in the case where the robot controller 14 is of the speed control type, the output is a speed command value. In the case where the robot controller 14 is of the torque control type, the output is a torque command value.

In other words, the output from the force control device 22 is the position command value, the speed command value, or the torque command value according to the input of the robot controller 14. Thus, the force control device 22 creates the position command value, the speed command value, or the torque command value to the end effector 18 by the detected data of the force sensor 16, and inputs the same to the robot controller 14.

Figure 4:
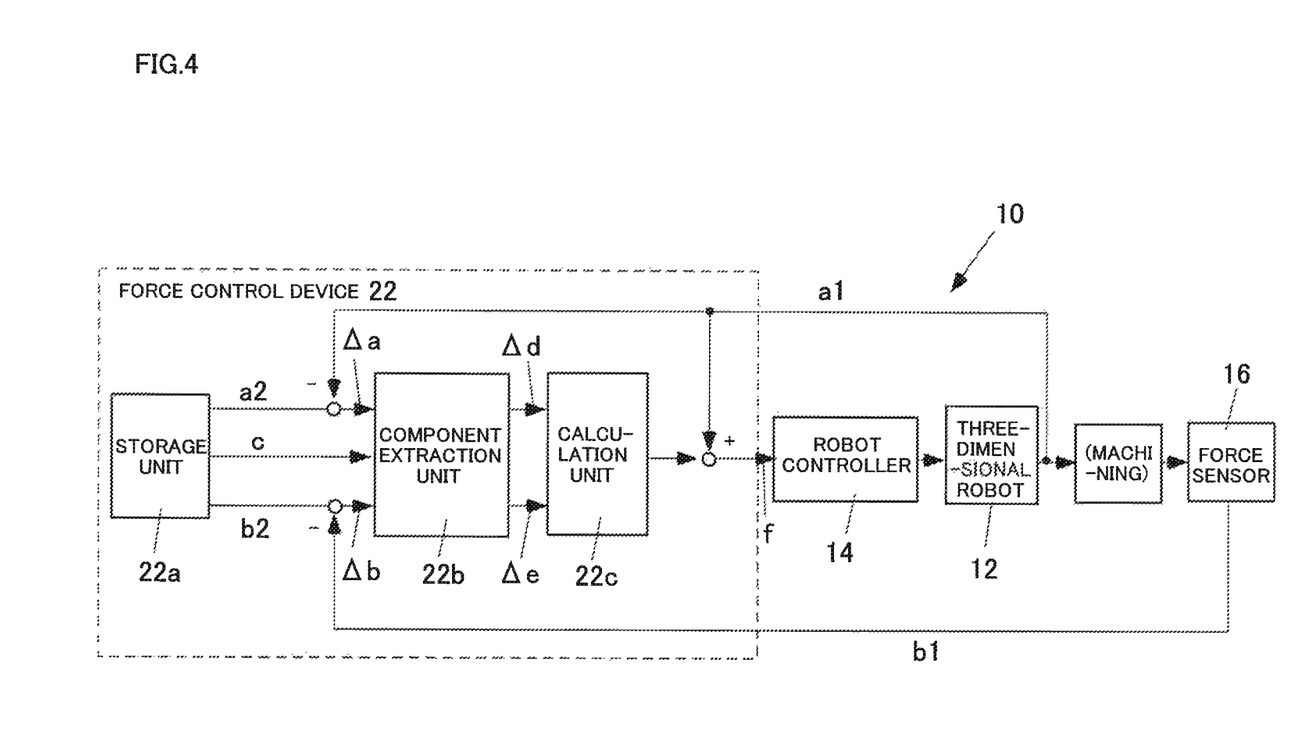
FIG. 4 is a control block diagram of the force control robot according to the embodiment.

In other words, FIG. 4 illustrates a case where the robot controller 14 is of the position command type. However, even if the robot controller 14 is of the speed command type or the torque command type, a similar function can be realized by taking a speed control calculation and a position control calculation carried out in the robot controller 14 into the force control device 22.

Further, the force control device 22 and the robot controller 14 are not necessarily separated from each other, and may be integrated.

In a method for controlling the force control robot 10, the force control device 22 and the robot controller 14 position-control the whole pair of machining tools 18A and 18B, and force-control the same in a machining direction (direction perpendicular to the surface of paper in FIG. 1) orthogonal to both of one direction perpendicular to the tool rotational axis 21 and the axial direction of the tool rotational axis 21, and perform torque control around the tool rotational axis 21.

The position control is carried out in one direction (left-right direction in FIG. 1) perpendicular to the tool rotational axis 21, the axial direction of the tool rotational axis 21, or a composite direction of the one direction and the axial direction thereof.

Figure 2:
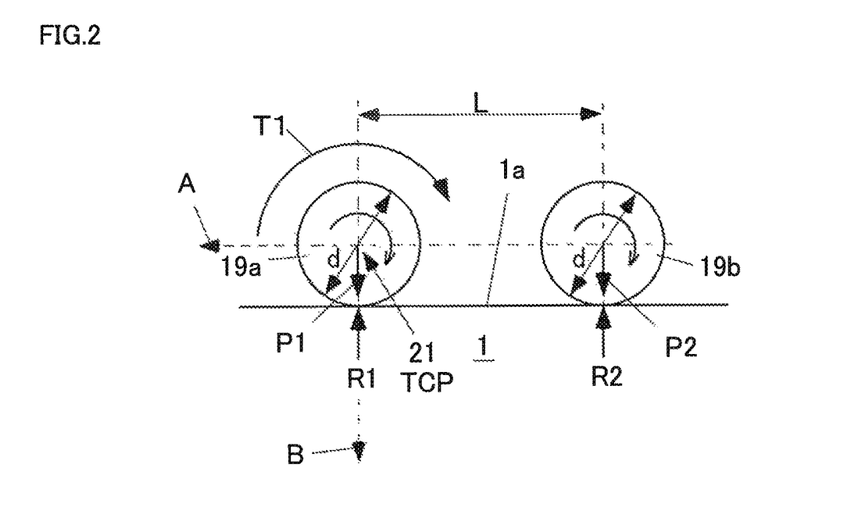
FIG. 2 is a principle explanatory diagram of the embodiment.

FIG. 2 is a diagram viewing from the arrow direction of an A-A line of FIG. 1, and an explanatory diagram of the principle of the present embodiment.

In this example, a machining surface 1*a* of the workpiece 1 is plane. The pair of machining tools 18A and 18B are arranged parallel to each other. The cylindrical tools 19*a* and 19*b* have the same diameter d. Further, a TCP (tool reference point) and the tool rotational axis 21 are assumed to be placed in the center of the tool 19*a* on the left side of FIG. 2.

Hereinafter, in this FIG. 2, the tool 19*a* on the left side is called a first tool 19*a*, and the tool 19*b* on the right side is called a second tool 19*b*.

In FIG. 2, the pair of machining tools 18A and 18B is position-controlled, and is force-controlled in a machining direction B (downward direction in FIG. 2). Further, the pair of machining tools 18A and 18B is torque-controlled around the tool rotational axis 21.

The position control is carried out in one direction (hereinafter "direction A": the left direction in FIG. 2) perpendicular to the tool rotational axis 21, an axial direction of the tool rotational axis 21, or a composite direction of the one direction and the axial direction of the tool rotational axis 21.

In other words, the first tool 19*a* taken as a reference is controlled by using feedback information from the force sensor 16 so that constant pressing force P1 (=reaction force R1) acts thereon in the machining direction B perpendicular to the direction A.

Further, torque T1 around the axis of rotation of the first tool 19*a* is controlled. Since the torque T1 is torque centering the rotational axis of the first tool 19*a*, the torque T1 does not affect the pressing force P1 of the first tool 19*a*. In other words, the torque T1 rotates the second tool 19*b* around the rotational axis of the first tool 19*a* to press the second tool 19*b* against the machining surface 1*a* of the workpiece 1.

Thus, as illustrated in FIG. 2, in a case where the machining surface 1*a* of the workpiece 1 is plane, and the first tool 19*a* and the second tool 19*b* are the same in diameter (tool diameter), when the pressing force by the second tool 19*b* is assumed to be P2, target pressing force P2 is obtained by performing torque control by the torque T1=P2×L.

FIG. 3A to FIG. 3D are correction explanatory diagrams of the pressing force P. Since reaction force R2 generated by the torque control actually affects the pressing force P1, the pressing force P is corrected in the following manner.

Figure 3A:
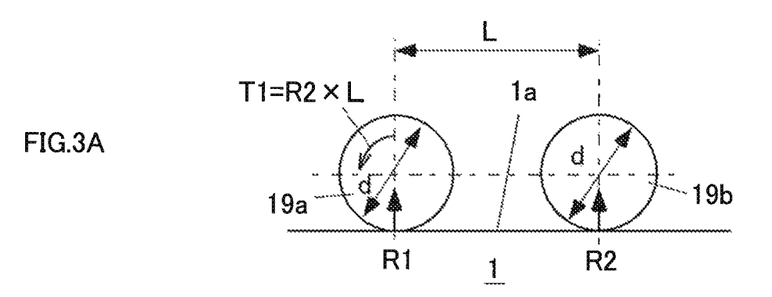
FIG. 3A is a correction explanatory diagram of pressing force.
Figure 3B:
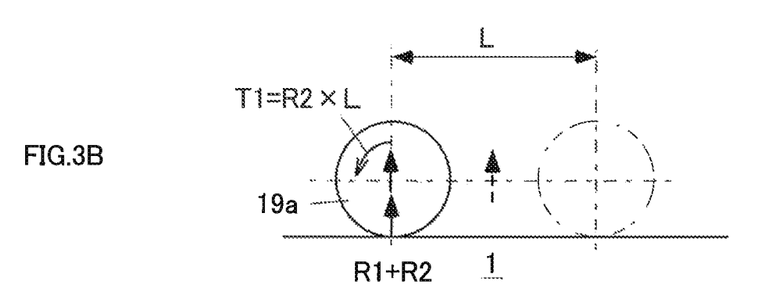
FIG. 3B is another correction explanatory diagram of the pressing force.

When the state of FIG. 3A is assumed to be a target state, reaction force (R1+R2) acts on the first tool 19*a* in a case where the force and torque are calculated by a TCP coordinate system (a local coordinate system with the tool reference point as the origin) (refer to FIG. 3B). Described time-sequentially, when the force and torque measured by the force sensor 16 are converted into the force and torque in the TCP coordinate system of the first tool 19*a*, FIG. 3B is obtained, and a control arithmetic operation is carried out using this.

Thus, when the target value of the pressing force P1 is assumed to be R1 (=P1), it is not preferred because feedback acts in a direction in which the first tool 19*a* is separated from the workpiece 1. Therefore, in order to prevent this, the target value of the pressing force P1 is set to (R1+R2). Consequently, the pressing force can be controlled to be in the state of FIG. 3A.

Figure 3C:
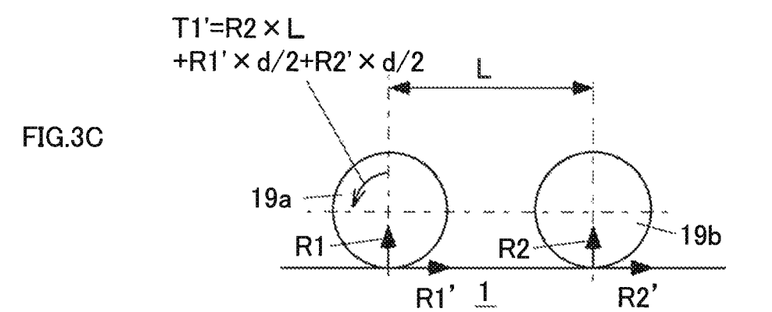
FIG. 3C is another correction explanatory diagram of the pressing force.

Further, a state becomes that of FIG. 3C when tool rotation and reaction force due to the tool rotation are taken into consideration. The reaction force (anti-torque) of the torque T1 becomes T1'=R2×L+R1'×d/2+R2'×d/2, so that torque generated by the reaction force R1' and R2' due to the tool rotation are mixed therein. Here, d is the diameter of the tool.

Figure 3D:
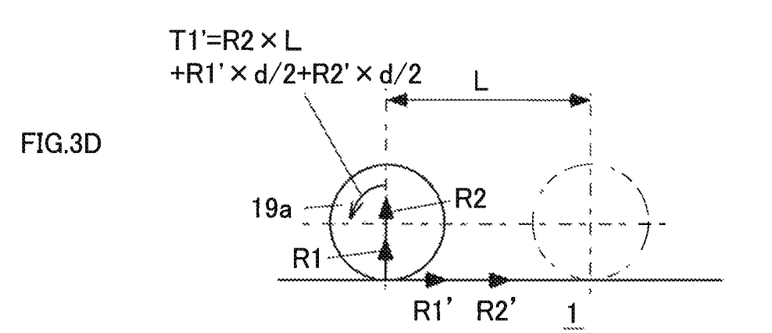
FIG. 3D is another correction explanatory diagram of the pressing force.

However, when calculating the force and torque on the TCP coordinate system from the measured value of the force sensor 16, a state becomes that of FIG. 3D, and hence, the reaction force due to the tool rotation can be independently measured as (R1'+R2'). If by using this, the component of the reaction force due to the tool rotation is removed from the reaction torque T1', the effect of the tool rotation is eliminated, i.e., if (R1'+R2')×d/2 is subtracted from the measured reaction force T1' to perform torque control based on the target value (reaction force R2×L), a state can be controlled to be that of FIG. 3C.

Thus, the pressing force P1 and P2 (i.e., reaction force R1 and R2 from the workpiece 1) of the two tools 19*a* and 19*b* can respectively be independently controlled by controlling the pressing force P1 and the torque T1 as described above.

In FIG. 2, spatial six degrees of freedom (positions in orthogonal three-axis directions and rotational angles around three axes) are provided in order to determine the spatial position and orientation of the first tool 19*a*. Since, however, the first tool 19*a* is a rotating tool, the any orientation around the rotational axis of the rotating tool enables machining. Therefore, five degrees of freedom may actually be provided to determine the position and orientation of the first tool 19a. Thus, one translational degree of freedom in the machining direction B is force-controlled by the pressing force P1 with respect to the first tool 19a, and the position control for feeding is performed by the remaining four degrees of freedom (two translational degrees of freedom and two rotational degrees of freedom).

Meanwhile, in the embodiment, a general multi-point arm robot (i.e., six-axis robot) is assumed as the three-dimensional robot 12. The six-axis robot has a configuration of being capable of providing spatial six degrees of freedom, and has one redundant degree of freedom for the above-described state. For this reason, torque control on the torque T1 is performed by the orientation degree of freedom around the tool rotational axis 21 which becomes the remaining one degree of freedom, to thereby apply the pressing force P2 to the second tool 19b.

In this example, the five degrees of freedom is provided to determine the position and orientation of the first tool 19a, but the degree of freedom can further be reduced depending on the shape of the workpiece 1 to be machined, i.e., the trajectories to be drawn by the tools 19a and 19b.

Accordingly, it is not a requirement to use the three-dimensional robot 12 having 6 or more degrees of freedom, but it is sufficient to have a redundant degree of freedom corresponding to a +1 degree of freedom with respect to the degree of freedom used for machining.

FIG. 4 is a control block diagram of the force control robot 10 according to the embodiment.

In this figure, the three-dimensional robot 12 feeds back positional information a1 of the end effector 18 during workpiece machining to the force control device 22. Further, the force sensor 16 feeds back force information b1 (force received from outside in orthogonal three-axis directions and torque around orthogonal three axes) acting on the end effector 18 during the workpiece machining.

The force control device 22 includes a storage unit 22a which stores a machining condition generated offline in advance, a component extraction unit 22b for the position control and the force control, and a calculation unit 22c which calculates the position control and the force control.

The storage unit 22a outputs a position trajectory a2, a pressing direction c, and force information b2 (force and torque). A difference Δa between the position trajectory a2 and the feedbacked position information a1, the pressing direction c, and a difference Δb between the force information b2 and the feedbacked force information b1 are input to the component extraction unit 22b.

The component extraction unit 22b outputs a position error Δd and a force error Δe from Δa, Δb and the pressing direction c. The output position error Δd and force error Δe are input to the calculation unit 22c. To the output, based on this input, from the calculation unit 22c, the feedbacked position information a1 is added. A position command value f obtained as the result thereof is output to the robot controller 14.

In FIG. 2, the position command value f is set to position-control the pair of machining tools 18A and 18B in the direction A (one direction orthogonal to the tool rotational axis 21), and force-control the pair of machining tools 18A and 18B in the machining direction B. Further, the position command value f is set to perform torque control around the tool rotational axis 21.

Accordingly, by controlling the position and orientation of the three-dimensional robot 12 so as to become the position command value f, the robot controller 14 can position-control the pair of machining tools 18A and 18B in the direction A, and can force-control the pair of machining tools 18A and 18B in the machining direction B, and can perform the torque control around the tool rotational axis 21.

A description will be made about, for example, the case where the position of the pair of machining tools 18A and 18B is controlled to be X=100 [mm] in the direction A (which is assumed to be an X-axis direction herein) by the position control, the force acting on the pair of machining tools 18A and 18B is controlled to be Fy=5N in the machining direction B (which is assumed to be a Y direction herein) by the force control, and the torque around the tool rotational axis 21 (which is assumed to be around a Z-axis herein) which is applied to the pair of machining tools 18A and 18B is controlled to be Tz=1 [Nm].

Here, when the command value f is a position command value, for example, the command value f can be set to be a vector referred to as f={fx[mm], fy[mm], fz[degrees]} represented by the following equations. Each numerical value in the following equations is an example.

$fx$ [mm]=(position target value 100 mm−measurement position 90 mm in $X$ direction)×position control gain+measurement position 90 mm in $X$ direction, $fy$ [mm]=(force target value 5N−measured force 4N in $Y$ direction)×force control gain+measurement position 45 mm in $Y$ direction, and $fz$ (degrees)=(torque target value 1 Nm−measured torque 0.8 Nm)×torque control gain+measurement angle 35 degrees around Z-axis.

Such fx, fy and fz are generated by the force control device 22 and input to the robot controller 14.

The measurement position in the X direction, the measurement position in the Y direction, and the measurement angle around the Z-axis are input to the robot controller 14. The robot controller 14 controls the pair of machining tools 18A and 18B with respect to the X direction such that the input measurement position in the X direction becomes the input fx, controls the pair of machining tools 18A and 18B with respect to the Y direction such that the input measurement position in the Y direction becomes the input fy, and controls the pair of machining tools 18A and 18B with respect to around the Z-axis such that the input measurement angle (i.e., measurement position) around the Z-axis becomes the input fz. As a result, the pair of machining tools 18A and 18B is position-controlled in the X direction, force-controlled in the machining direction B, and torque-controlled around the tool rotational axis 21.

When the command value f is a speed command value f, the command value f={fx[mm]/s], fy[mm/s], fz[degrees/s]} is calculated, for example, as follows:

$fx$ [mm/s]=(position target value−measurement position in $X$ direction)×positon control gain+measurement speed in $X$ direction, $fy$ [mm/s]=(force target value−measured force in $Y$ direction)×force control gain+measurement speed in $Y$ direction, and $fz$[degrees/s]=(torque target value−measured torque)× torque control gain+measurement speed around Z-axis.

Such fx, fy and fz are generated by the force control device 22 and input to the robot controller 14.

The measurement speed in the X direction, the measurement speed in the Y direction, and the measurement speed around the Z-axis are input to the robot controller 14. The robot controller 14 controls the pair of machining tools 18A and 18B with respect to the X direction such that the input measurement speed in the X direction becomes the input fx, controls the pair of machining tools 18A and 18B with respect to the Y direction such that the input measurement speed in the Y direction becomes the input fy, and controls the pair of machining tools 18A and 18B with respect to around the Z-axis such that the input measurement speed around the Z-axis becomes the input fz. As a result, the pair of machining tools 18A and 18B is position-controlled in the X direction, force-controlled in the machining direction B, and torque-controlled around the tool rotational axis 21.

When the command value f is a torque command value f, the command value f={fx[Nm], fy[Nm], fz[Nm]} is calculated, for example, as follows:

*fx* [Nm]=(position target value−measurement position in *X* direction)×positon control gain+measurement torque related to *X* direction,

*fy* [Nm]=(force target value−measured force in *Y* direction)×force control gain+measurement torque related to *Y* direction, and

*fz* [Nm]=(torque target value−measured torque)× torque control gain+measurement torque around Z-axis.

Such fx, fy and fz are generated by the force control device 22 and input to the robot controller 14.

The measurement torque related to the X direction, the measurement torque related to the Y direction, and the measurement torque around the Z-axis are input to the robot controller 14. The robot controller 14 controls the pair of machining tools 18A and 18B with respect to the X direction such that the input measurement torque related to the X direction becomes the input fx, controls the pair machining tools 18A and 18B with respect to the Y direction such that the input measurement torque related to the Y direction becomes the input fy, and controls the pair of machining tools 18A and 18B with respect to around the Z-axis such that the input measurement torque around the Z-axis becomes the input fz. As a result, the pair of machining tools 18A and 18B is position-controlled in the X direction, force-controlled in the machining direction B, and torque-controlled around the tool rotational axis 21.

$R2=T1/L$ . . . (1) is established when the machining surface 1a of the workpiece 1 is plane, and the tool diameters (diameters d) of the first tool 19a and the second tool 19b are the same. It is however also considered that actually the tool diameters are different from each other and different tools are used. Further, there also exists a case where the machining surface 1a of the workpiece 1 has a curvature or the like.

Figure 5:
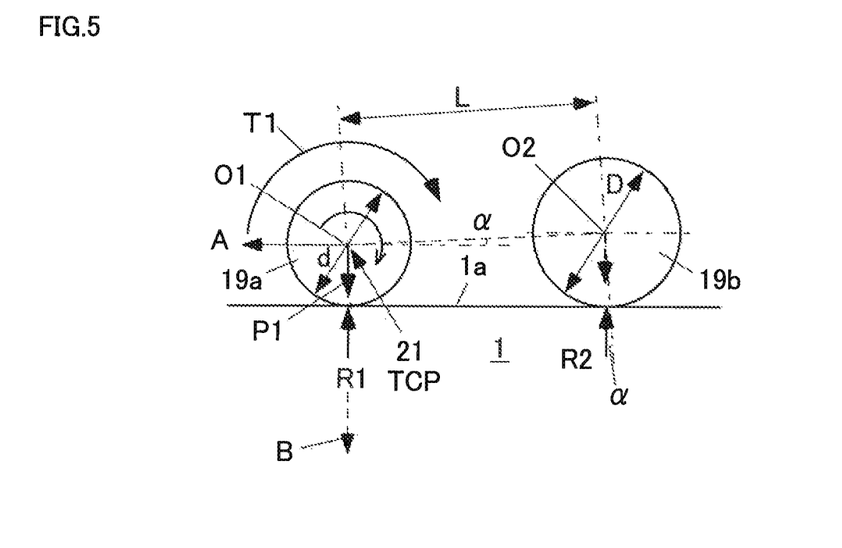
FIG. 5 is a schematic diagram when tool diameters are different from each other.

FIG. 5 is a schematic diagram similar to FIG. 2 when the tool diameters are different from each other.

In this figure, there is shown a case where the machining surface 1a of the workpiece 1 is plane, the diameter of the first tool 19a is d, the diameter of the second tool 19b is D, and D>d. When the tool diameters are different from each other, an angular error due to a difference between the diameters occurs.

In FIG. 5, the length of a line segment (O1-O2) which connects the center O1 of the first tool 19a and the center O2 of the second tool 19b, is assumed to be L, and the angle that a straight line perpendicular to the line segment (O1-O2) and passing through the center O2 forms with the direction of the reaction force R2 of the second tool 19b is assumed to be a.

In this case, the reaction force R2 of the second tool 19b is given by $R2=T1/L \cdot \cos \alpha$ . . . (2).

Figure 6:
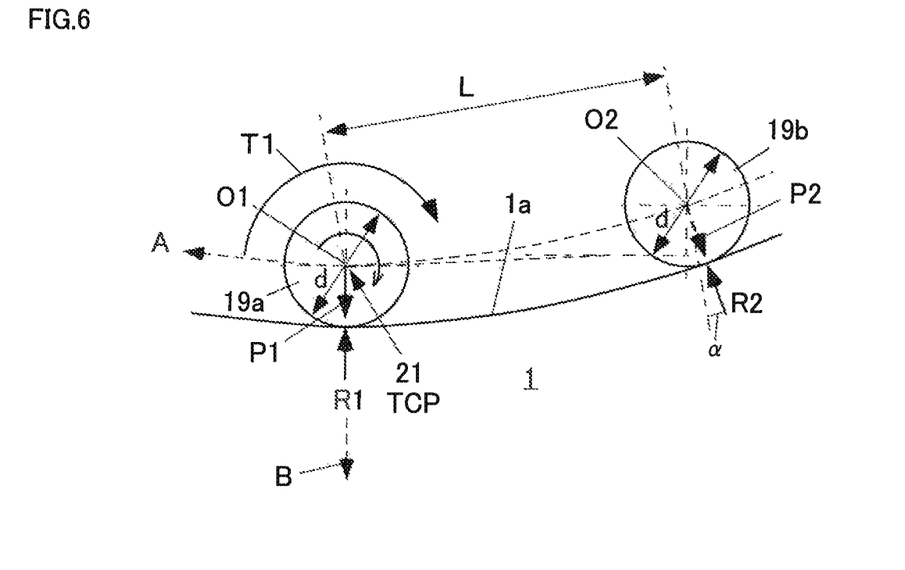
FIG. 6 is a schematic diagram when a machining surface of a workpiece is a curved surface.

FIG. 6 is a schematic diagram similar to FIG. 2 when the machining surface 1a of the workpiece 1 is a curved surface.

In this figure, the machining surface 1a of the workpiece 1 is of the curved surface and the diameters d of the first tool 19a and the second tool 19b are the same. In the case of the curved surface, an angular error caused by a curvature or the like occurs.

In FIG. 6, similarly to FIG. 5, the length of a line segment (O1-O2) which connects the center O1 of the first tool 19a and the center O2 of the second tool 19b is assumed to be L, and the angle that a straight line perpendicular to the line segment (O1-O2) and passing through the center O2 forms with the direction of reaction force R2 of the second tool 19b is assumed to be α.

In this case, similarly to FIG. 5, the reaction force R2 of the second tool 19b is given by $R2=T1/L \cdot \cos \alpha$ . . . (2).

In the examples of FIG. 5 and FIG. 6, $R2=T1/L$ . . . (1) is substantially established when the angle α is sufficiently small. Thus, in this case, the equation (1) can be used as it is. Further, the equation (1) can also be applied by adjusting the value of the torque T1.

Thus, the reaction force R2 of the second tool 19b can be easily calculated according to the angle α.

Figure 7:
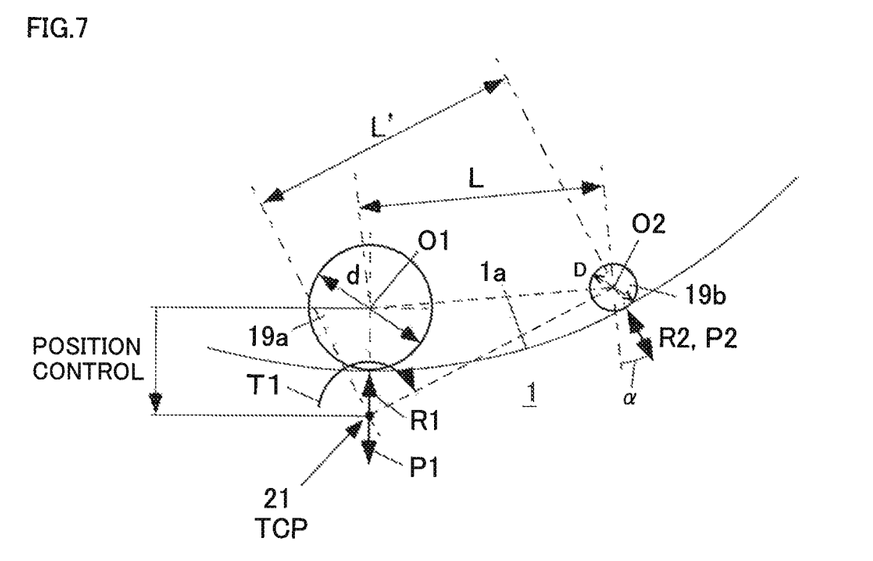
FIG. 7 is a schematic diagram illustrating a method for correcting an angular error.

FIG. 7 is a schematic diagram similar to FIG. 2 showing a method for correcting an angular error.

In this figure, there is shown a case where the machining surface 1a of the workpiece 1 is a curved surface, the diameter of the first tool 19a is d, the diameter of the second tool 19b is D, and D<d. In this case, an angular error caused by a difference between the tool diameters and the curved surface occurs.

In FIG. 7, similarly to FIG. 5, the length of a line segment (O1-O2) which connects the center O1 of the first tool 19a and the center O2 of the second tool 19b is assumed to be L, and the angle that a straight line perpendicular to the line segment (O1-O2) and passing through the center O2 forms with the direction of reaction force R2 of the second tool 19b is assumed to be α.

In this example, the diameters d and D of the tools 19a and 19b to be used can be grasped in advance. Further, the shape of the machining surface 1a of the workpiece 1 has also normally been known in advance. Accordingly, the reaction force R2 of the second tool 19b can be easily determined by appropriately correcting the torque center position (i.e., the position of the tool rotational axis 21) for the torque-control, and correcting the value of the torque T1.

As illustrated in FIG. 5 to FIG. 7, when the angular error is sufficiently small, the reaction force R2 of the second tool 19b can be expressed by the equation (1). When, however, the angular error is large and gives an influence or the like to machining and control, the angular error is corrected using advance information such as the tool diameter, the curvature, and the like.

In the first embodiment described above, since the pair of machining tools 18A and 18B is attached to the single force sensor 16, by position-controlling one of the tools 19a and 19b, the other of the tools 19a and 19b also moves on substantially the same trajectory. Therefore, it is possible to take in advance suitable positions relative to the workpiece 1, and to thereby move the tools 19a and 19b in a state in which the pressing force P1 and P2 of the tools 19a and 19b is each being controlled, and to make machining such as polishing, chamfering, deburring of the machining surface 1a of the workpiece 1. Further, since the first tool 19a itself is a rotating tool though the first tool 19a is rotated around its own rotational axis by performing torque control around the tool rotational axis 21, the machining is unaffected even if the first tool 19a is rotated.

Thus, the pressing force P1 and P2 (i.e., reaction force R1 and R2 from the workpiece 1) of the two tools 19a and 19b can respectively be independently controlled by controlling the above-described pressing force P1 and torque T1.

Although the operation of polishing the surface of the workpiece 1 has been described in the above-described first embodiment, similar operation is possible even with respect to edge machining such as deburring or chamfering (e.g., C-chamfering).

Figure 8A:
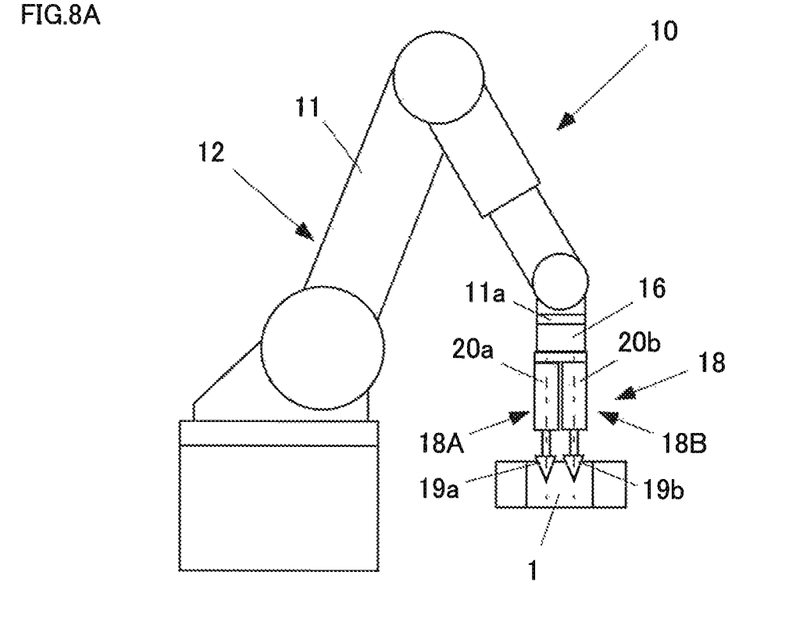
FIG. 8A is a second embodiment diagram of a force control robot.
Figure 8B:
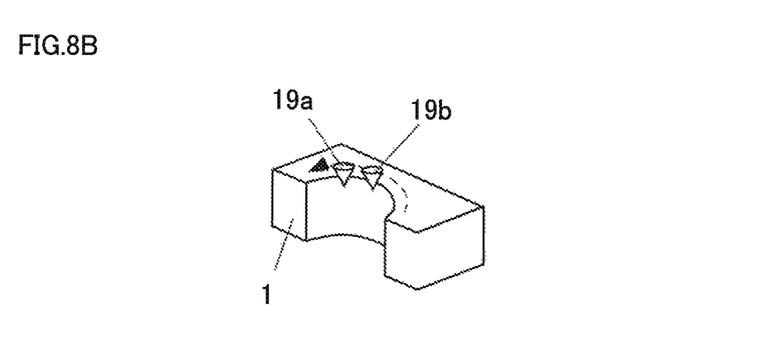
FIG. 8B illustrates the manner in which a surface roughly finished by a first tool is precisely finished by a second tool in the force control robot of FIG. 8A.

FIG. 8A and FIG. 8B are respectively second embodiment diagrams of a force control robot 10 according to an embodiment.

In FIG. 8A, a first tool 19a and a second tool 19b are respectively conical tools. The first tool 19a is a cutting tool and the second tool 19b is a polishing tool.

As in this example, the first tool 19a and the second tool 19b may be separate tools. Upon the actual machining, for example, there also often occur cases in which rough finishing is first performed using a tool coarse in grain size and thereafter final-precision finishing is performed on the same surface using a tool fine in grain size.

In other words, there is considered a configuration in which by using the rough finishing tool as the first tool 19a and the fine-precision finishing tool as the second tool 19b, a surface roughly finished earlier by the first tool 19a is sequentially finished precisely by the second tool 19b as illustrated in FIG. 8B.

Further, although in the above-described first embodiment, the first tool 19a is used as reference, the first tool 19a is controlled with the constant pressing force P1, and the torque T1 around the rotational axis of the first tool 19a is controlled, the TCP (tool reference point) and the rotation axis of torque can also be set at other locations.

Figure 9:
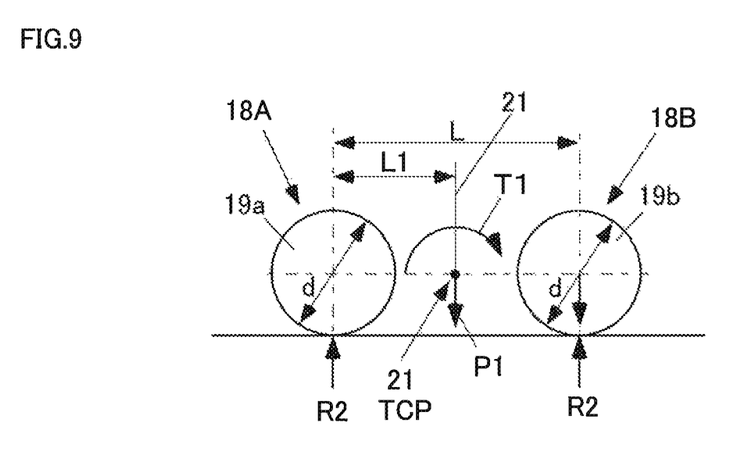
FIG. 9 is a schematic diagram in which a TCP and a tool rotational axis are set between the centers of the first tool and the second tool.

FIG. 9 is a schematic diagram similar to FIG. 2, in which a TCP and a tool rotational axis 21 are set between the centers of the first tool 19a and the second tool 19b.

In this example, it is possible to determine respective reaction force R1 and R2 from the synthesis of pressing force P1 and torque T1 for the TCP.

There is considered a configuration in which when the first tool 19a and the second tool 19b are the same, and a machining surface 1a of a workpiece 1 is plane or a surface close to a plane surface, on assumption of L1=L/2 and T1=0, the reaction force is set as R1=R2=P1/2, and the rotation is made free in the configuration of FIG. 9.

In other words, the tool rotational axis 21 is positioned on a midpoint of rotational shafts of a pair of machining tools 18A and 18B and parallel with the rotational shafts of the pair of machining tools 18A and 18B, and the torque T1 by the torque control is controlled to be 0.

There is an effect that the measurement center of a force sensor 16, the TCP, and the tool rotational axis 21 are aligned in this manner to thereby enable facilitation of calibration, and the like, and make it hard to cause errors or the like due to a calibration calculation.

Figure 10A:
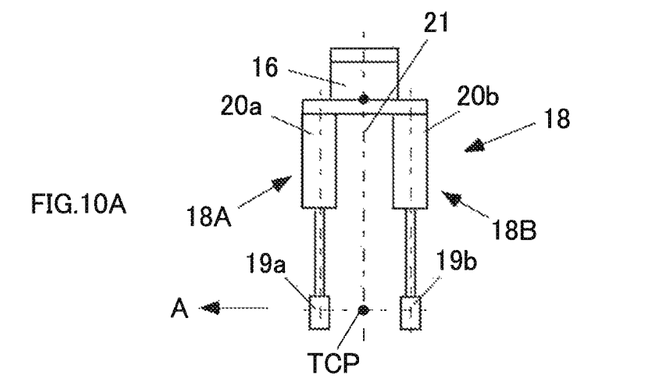
FIG. 10A is a third embodiment diagram of a force control robot.
Figure 10B:
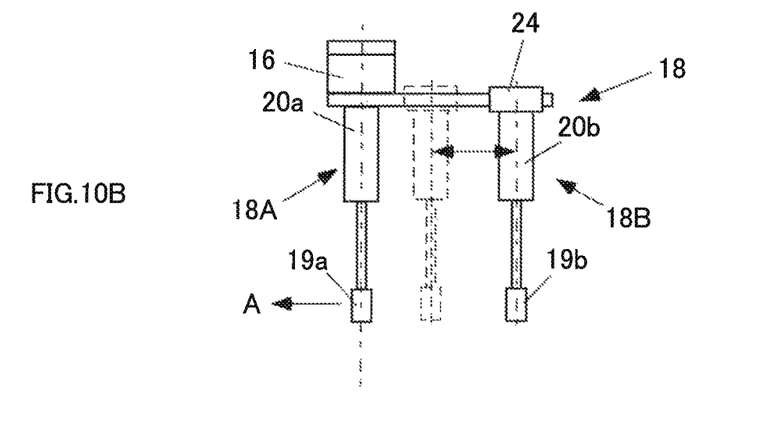
FIG. 10B is a fourth embodiment diagram of a force control robot.
Figure 10C:
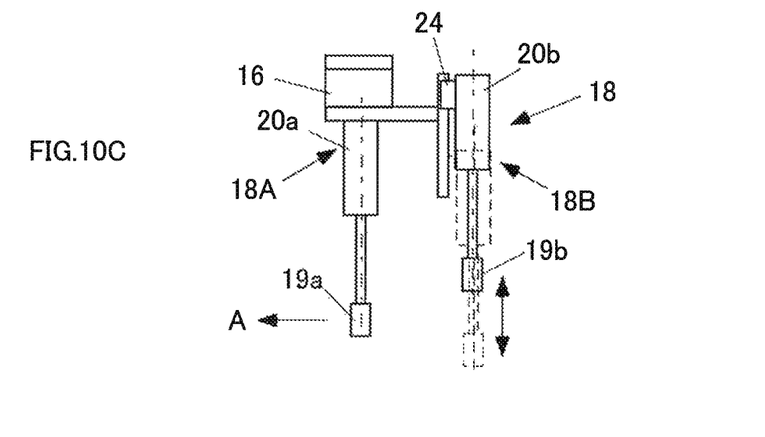
FIG. 10C is a fifth embodiment diagram of a force control robot.

FIG. 10A to FIG. 10C are respectively third to fifth embodiment diagrams of force control robots 10.

FIG. 10A is the third embodiment diagram. This example corresponds to FIG. 9, and is equivalent to one in which a TCP and a tool rotational axis 21 are set between the centers of a first tool 19a and a second tool 19b, and L1=L/2.

As illustrated in this figure, a measurement center of a force sensor 16, a reaction force position intended to obtain, and the like are appropriately aligned to thereby enable facilitation of calibration, and the like, and make errors or the like due to a calibration calculation harder to appear.

FIG. 10B is the fourth embodiment diagram and an example in which an interval L in a direction A between a pair of spindles 20a and 20b is made variable by a positioning device 24 (e.g., slide).

Further, FIG. 10C is the fifth embodiment diagram and an example in which an axial position of a second tool 19b relative to a first tool 19a is made variable by a positioning device 24 (e.g., slide).

Introducing the positioning device 24 between the first tool 19a and the second tool 19b as illustrated in FIG. 10B and FIG. 10C makes it possible to deal withe various workpiece shapes.

Figure 11A:
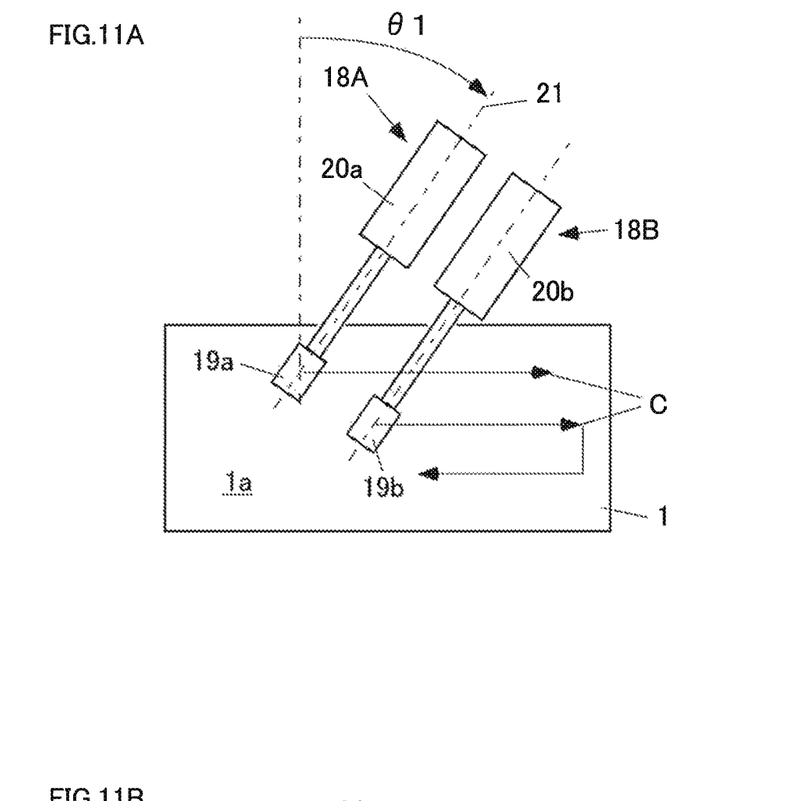
FIG. 11A is a front view illustrating a state in which a tool rotational axis of FIG. 1 is inclined along the machining surface of the workpiece.
Figure 11B:
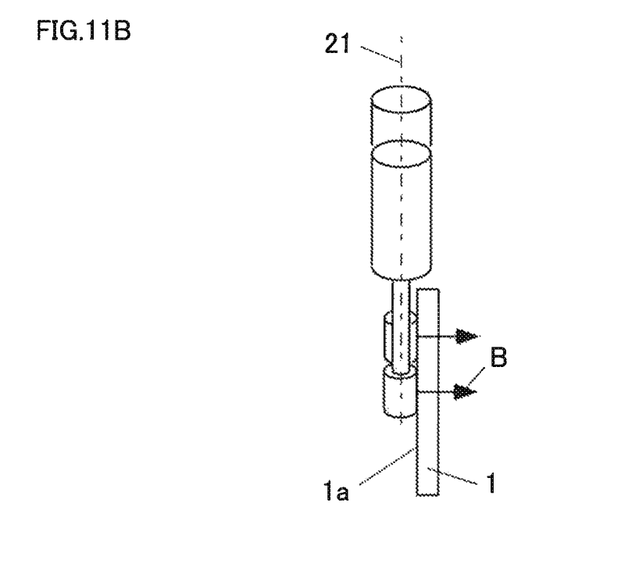
FIG. 11B is a right side view illustrating a state in which the tool rotational axis of FIG. 1 is inclined along the machining surface of the workpiece.

FIG. 11A and FIG. 11B are respectively diagrams illustrating a state in which the tool rotational axis 21 of FIG. 1 is tilted by an angle θ1 along the machining surface 1a of the workpiece 1. FIG. 11A is a front view, and FIG. 11B is a right side view.

In FIG. 11A and FIG. 11B, the pair of machining tools 18A and 18B is force-controlled in the direction (machining direction B) perpendicular to the machining surface 1a and torque-controlled around the tool rotational axis 21.

In this case, position control is may be performed in a direction C along the machining surface 1a.

Figure 12A:
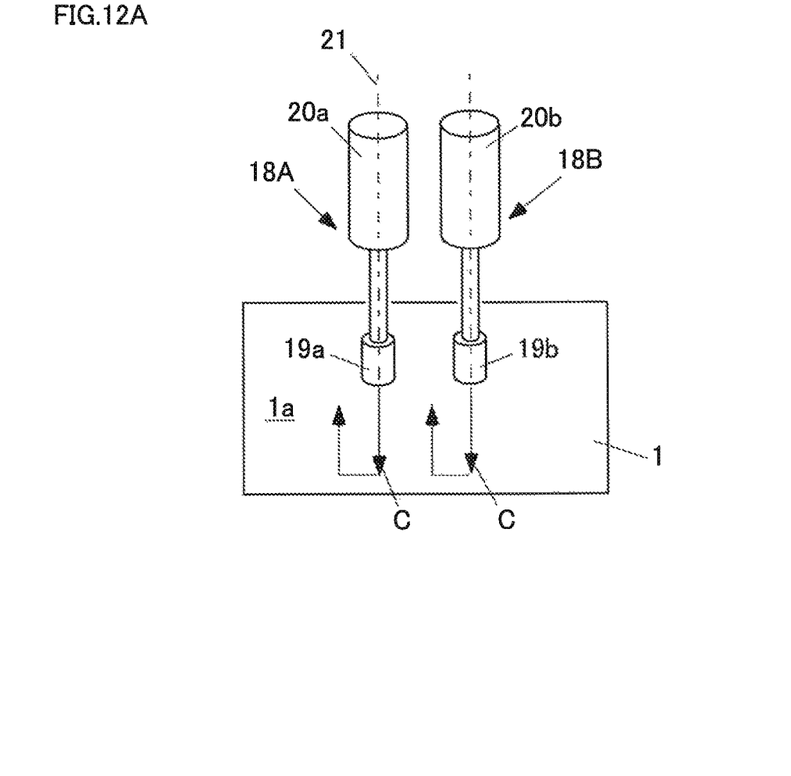
FIG. 12A is a front view illustrating a state in which the tool rotational axis of FIG. 1 is inclined with respect to the machining surface of the workpiece.
Figure 12B:
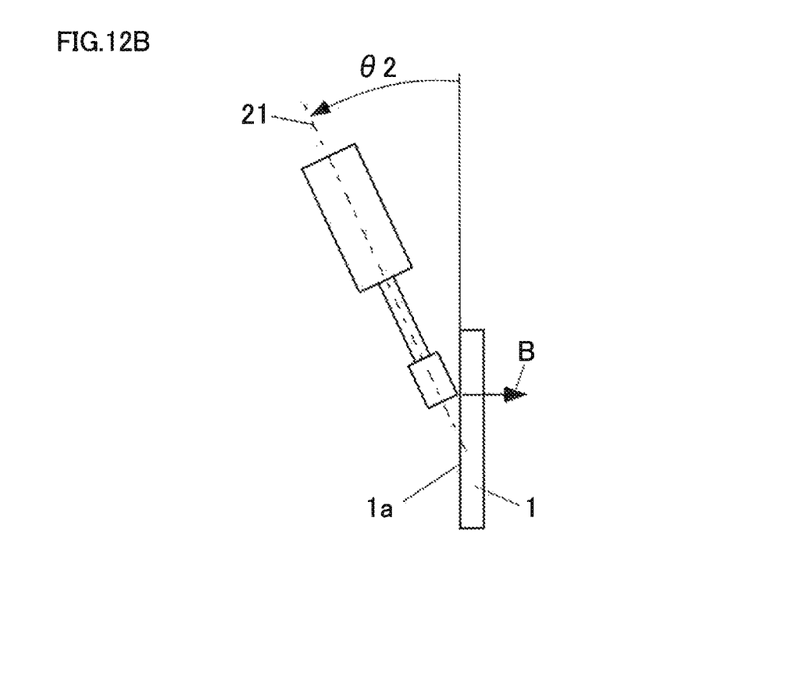
FIG. 12B is a right side view illustrating a state in which the tool rotational axis of FIG. 1 is inclined with respect to the machining surface of the workpiece.

FIG. 12A and FIG. 12B are respectively diagrams illustrating a state in which the tool rotational axis 21 of FIG. 1 is tilted by an angle θ2 with respect to the machining surface 1a of the workpiece 1. FIG. 12A is a front view, and FIG. 12B is a right side view.

In FIG. 12A and FIG. 12B, the pair of machining tools 18A and 18B is force-controlled in the direction (machining direction B) perpendicular to the machining surface 1a and torque-controlled around the tool rotational axis 21.

In this case, position control may be performed in a direction C along the machining surface 1a.

Further, even in a case of a state in which patterns of FIG. 11A and FIG. 11B, and FIG. 12A and FIG. 12B are combined together, likewise, position control may be performed in the direction C along the machining surface 1a.

According to the embodiments described above, even if the machining speed (i.e., feed speed) by the single machining tool is the same as conventional one, a machining speed twice the machining speed can be achieved by the two machining tools 18A and 18B.

Thus, since the two tools 19a and 19b can be simultaneously operated by one robot, it is possible to enhance the productivity (machining amount) while ensuring the stability of machining without increasing the machining speed by the single machining tool. Further, since the number of robots is not increased although the number of tools is increased, the cost of equipment is hardly increased either.

The disclosure is not limited to the above-described embodiments, and is indicated by the claims. Further, the disclosure includes all modifications within the meaning and scope of descriptions and equivalents of the claims.

REFERENCE SIGNS LIST 1 workpiece
1a machining surface
10 force control robot
11 robot arm
11a hand tip portion
12 three-dimensional robot
14 robot controller
16 force sensor 18 end effector
18A, 18B machining tool
19a tool (first tool)
19b tool (second tool)
20a, 20b spindle
21 tool rotational axis
22 force control device
22a storage unit
22b component extraction unit
22c calculation unit
24 positioning device (e.g., slide).

The invention claimed is:

1. A force control robot, comprising:
a force sensor attached to a hand tip portion; and
an end effector attached to the force sensor,
wherein the end effector includes a pair of machining tools spaced apart from each other in one direction perpendicular to a tool rotational axis and rotatable around the tool rotational axis,
the force control robot includes a three-dimensional robot capable of moving the hand tip portion in a three-dimensional space in terms of a position and orientation thereof, a robot controller which controls a position and orientation of the three-dimensional robot, and a force control device which creates a position command value, a speed command value, or a torque command value for the end effector on the basis of detected data of the force sensor and inputs the same to the robot controller, and
wherein the force control robot position-controls the pair of machining tools, force-controls the pair of machining tools in a machining direction perpendicular to the one direction and an axial direction of the tool rotational axis, and torque-controls the pair of machining tools around the tool rotational axis.

2. A method for controlling a force control robot including a force sensor attached to a hand tip portion and an end effector attached to the force sensor,
wherein the end effector includes a pair of machining tools spaced apart from each other in one direction perpendicular to a tool rotational axis and rotatable around the tool rotational axis, and
the method position-controls the pair of machining tools, force-controls the pair of machining tools in a machining direction perpendicular to the one direction and an axial direction of the tool rotational axis, and torque-controls the pair of machining tools around the tool rotational axis.

3. The method for controlling the force control robot according to claim 2, wherein the position control is carried out in the one direction, the axial direction of the tool rotational axis, or a composite direction of the one direction and the axial direction of the tool rotational axis.

4. The method for controlling the force control robot according to claim 2, wherein the position control is carried out in a direction along a machining surface of a workpiece.

5. The method for controlling the force control robot according to claim 2, wherein rotational shafts of the pair of machining tools are arranged parallel to each other.

6. The method for controlling the force control robot according to claim 2, wherein the tool rotational axis is positioned on a rotational shaft of one of the pair of machining tools, and pressing force against the workpiece by the other machining tool is controlled by the torque control.

7. The method for controlling the force control robot according to claim 2, wherein the tool rotational axis is positioned on a midpoint of rotational shafts of the pair of machining tools to be parallel with the rotational shaft, and torque by the torque control is controlled to be 0.

* * * * *